United States Patent [19]

Burns

[11] Patent Number: 4,606,453

[45] Date of Patent: Aug. 19, 1986

[54] EYEGLASSES VISOR AND CASE

[76] Inventor: Catherine T. Burns, 1159 Cimarron Ct., Clarkston, Ga. 30021

[21] Appl. No.: 725,762

[22] Filed: Apr. 22, 1985

[51] Int. Cl.$^4$ .................................... A45C 11/04
[52] U.S. Cl. .................................... 206/5; 206/6; 2/13; 150/52 R
[58] Field of Search ............... 206/6.5; 2/13; 150/52 R

[56] References Cited

U.S. PATENT DOCUMENTS

| | | |
|---|---|---|
| 29,867 | 12/1898 | Guyer . |
| 103,879 | 3/1837 | Hirschberg . |
| 134,769 | 1/1843 | Ripin . |
| 189,994 | 3/1861 | Spielberg ........................... D57/1 |
| 750,926 | 2/1904 | Wilson . |
| 1,335,517 | 3/1920 | Mayerle . |
| 2,166,110 | 7/1939 | Baldanza ................................ 2/13 |
| 2,262,142 | 11/1941 | Karmsen ........................... 206/5 R |
| 2,557,552 | 6/1951 | Martin ................................ 206/5 R |
| 2,708,269 | 5/1955 | Von Gunten ........................... 2/13 |
| 3,011,170 | 12/1961 | Lutz ...................................... 2/13 |
| 3,023,418 | 3/1962 | Hammond ............................. 2/13 |

Primary Examiner—Joseph Man-Fu Moy
Attorney, Agent, or Firm—Thomas & Kennedy

[57] ABSTRACT

Two plies (20, 30) of crescent shaped material are placed in overlying relationship, with the plies being attached along their convex edges (21, 31). The concave edges (22, 32) remain unattached to each other, so that a pocket (29) is formed between the plies of material. Loops (41, 42) are formed at opposite edges of the convex edge of the plies of material. The limbs (14, 15) of eyeglasses can inserted through the loops so that the plies of material form a visor at the forehead of the wearer of the eyeglasses. In the alternative, the eyeglasses can be removed from the visor and inserted into the pocket, so that the plies of material form a case for the eyeglasses.

5 Claims, 10 Drawing Figures

EYEGLASSES VISOR AND CASE

BACKGROUND OF THE INVENTION

This invention relates to a visor that can be attached to the limbs of a pair of eyeglasses, so that the eyeglasses support the visor at the forehead of the wearer of the eyeglasses. More particularly, the visor is formed of two plies of material that are connected together along the convex edges of the plies of material but are left substantially unconnected along the concave edges, thereby forming a pocket in which eyeglasses or other objects can be stored.

Various visors or brims have been manufactured in the past for mounting at the forehead of a person so as to shade the eyes from the sun, etc. Most of the visors are attached to a hat which supports the visor at the forehead of the wearer of the hat. Also, some visors have been developed which comprise the visor with a band or clamp that extends rearwardly from the visor which is to fit about the head of the wearer so as to support the visor at the forehead of the wearer.

A common complaint with respect to sun visors is that the visor must be supported by the head of the wearer, by the hat or by the band that is to be mounted on the head. This is uncomfortable to some people, in that the hat, band, etc. is too tight or causes the head to perspire. In some cases, especially with women, it is not desirable and not fashionable to wear a hat or a band that interferes with the design of the hair arrangement.

BRIEF DESCRIPTION OF THE INVENTION

Briefly described, the present invention comprises a sun visor that is to be worn at the forehead of a person, and which is removably attachable to the limbs of eyeglasses of the wearer, with the visor being solely supported by the eyeglasses, without a hat or band structure engaging the head of the wearer. The visor comprises a crescent shaped bill that has looped elastic bands at its opposite corners, and the limbs of the eyeglasses are inserted through the loops. The looped bands support and stabilize the visor from the eyeglasses, causing the visor to be perched at a height slightly above the lenses of the eyeglasses. The looped bands can be slipped along the length of the limbs of the eyeglasses so as to bring the visor closer to or move the visor further away from the forehead of the wearer, so that the visor can be adjusted to suit the personal taste of the wearer.

The visor is formed from two plies of material, each ply formed in a crescent shape, having one concave edge and one convex edge. The plies of material are arranged in overlying relationship with the convex edges aligned and the concave edges aligned. The plies of material are attached to each other along the convex edges, which leaves the concave edges unattached. This forms the plies of material in a pocket having the concave edges of the plies of material forming the pocket opening. The pocket is sized and shaped so as to receive the eyeglasses of the wearer. A fastener is formed intermediate the ends of the convex edges of the plies of material so as to fasten the plies together about the eyeglasses when placed in the pocket, thereby holding the eyeglasses in the pocket.

Thus, it is an object of this invention to provide a visor that is removably mounted to and adjustable with respect to eyeglasses, so that the visor can be supported at the face of the wearer of the eyeglasses without additional support.

Another object of this invention is to provide a visor that functions both as a sun visor at the face of the wearer of the visor and as a pocket for storing various objects such as eyeglasses.

Another object of this invention is to provide a visor that is formed from two plies of material, with the convex edges of the visor attached together along their lengths, leaving their concave edges unattached, so that the visor forms a pocket for receiving various articles, such as eyeglasses.

Other objects, features and advantages of the present invention will become apparent upon reading the following specification, when taken in conjunction with the accompanying drawings.

DETAILED DESCRIPTION

Figure 1:
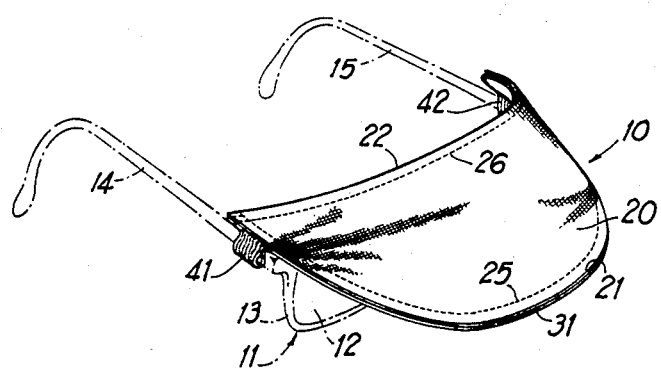
FIG. 1 is a perspective illustration of the eyeglasses visor and case, showing the visor and case attached to a pair of eyeglasses.
Figure 2:
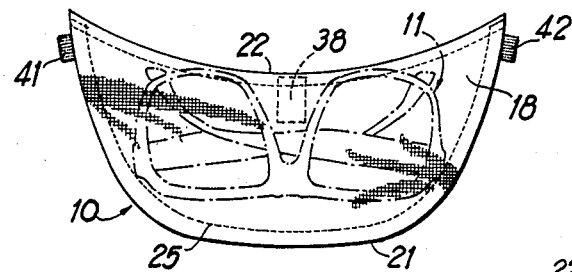
FIG. 2 is a top view of the visor and case, showing a pair of eyeglasses in dashed lines stored in the pocket of the visor.
Figure 5:
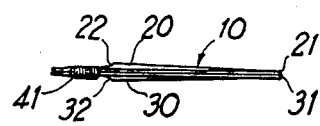
FIG. 5 is a side elevational view thereof.

Referring now in more detail to the drawings, in which like numerals indicate like parts throughout the several views, FIG. 1 illustrates the eyeglasses visor and case 10 mounted to a pair of eyeglasses 11. The eyeglasses 11 are of conventional design and include lenses 12, rims 13, and foldable limbs 14 and 15.

Figure 6:
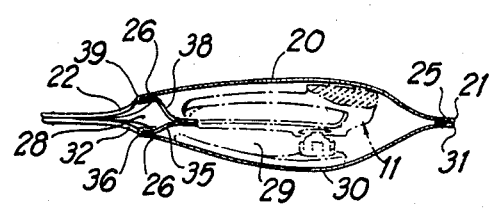
FIG. 6 is an enlarged side cross sectional view taken along lines 6—6 of FIG. 4, showing a pair of eyeglasses with the limbs folded across the lenses of the glasses, with the glasses inserted within the pocket of the visor case.
Figure 3:
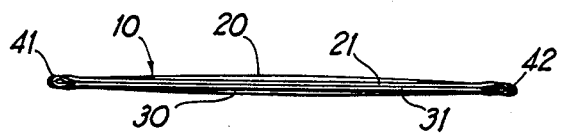
FIG. 3 is a front elevational view of the eyeglasses visor and case.
Figure 4:
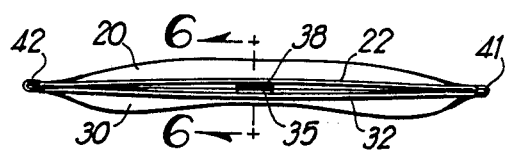
FIG. 4 is a back elevational view with the eyeglasses therein.
Figure 7:
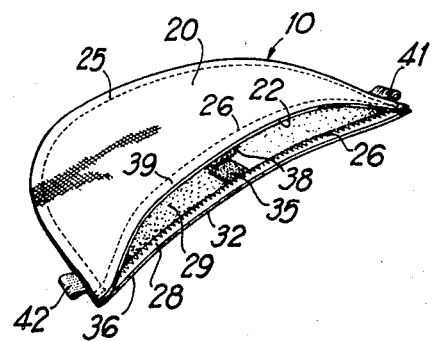
FIG. 7 is a perspective illustration of the eyeglasses visor and case, showing the pocket opening at the convex edges of the plies of material.
Figure 10:
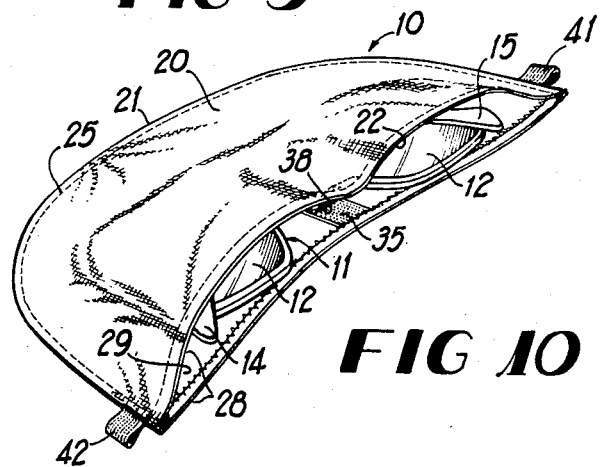
FIG. 10 is a perspective illustration of the eyeglasses visor and case, showing how a pair of eyeglasses is stored within the pocket.

The visor and case 10 is formed from two plies of material 20 and 30, with the ply 20 being illustrated as the upper ply and with the ply 30 being illustrated as the lower ply. However, the plies of material are identical in shape and the visor case can be used in an inverted attitude. Each ply of material includes a convex edge 21, 31 and a concave edge 22, 32. The convex edges are attached together along their lengths, as by stitching 25. The concave edges and convex edges of both plies of material are sewn into a hem. Also, the plies of material can be lined, if desired so as to form a soft inner surface, and to rigidify the visor case. The stitching 26 formed along the concave edges does not extend through both plies of material, but simply holds the hem. Therefore, the visor case is open at 28, so that the plies of material form a pocket 29 (FIGS. 6, 7 and 10).

A releasable fastener element 35 is sewn by the stitching 26 in concave hem 36 intermediate the ends of the concave edge 32 of the lower ply of material, while the releasable fastener element 38 is sewn by the stitching 26 intermediate the ends of the concave hem 39, with the fastener elements 35 and 38 being located in overlying relationship. The fastener elements illustrated herein are the loop and hook connection elements known by the tradename Velcro. Obviously, other fasteners such as snaps, buttons, zippers, etc., could be used if desired. The fastener elements 35 and 38 will hold the opening of the visor case closed intermediate the ends of the concave edges of the plies of material.

Figure 8:
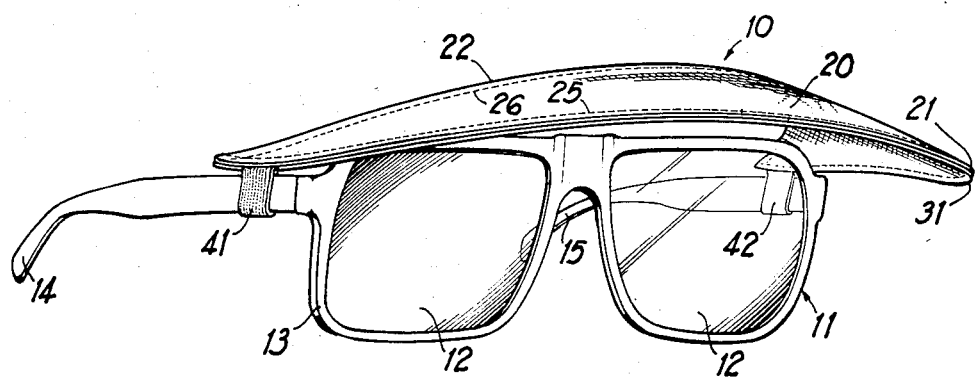
FIG. 8 is a perspective illustration of the eyeglasses visor and case mounted to a pair of eyeglasses.

Short lengths of band material 41 and 42 are sewn into the stitching 25 at the convex edges of the plies of material 20 and 30. The band material is folded double so as to form a loop that protrudes outwardly from the sides of the visor case. The size of the loops is carefully chosen so as to be suitable to receive the limbs 14 and 15 of a conventional pair of eyeglasses. Preferably, the band material will be required to stretch slightly to receive the limbs 14 and 15, so that the loops function to support the visor case in a relatively stable position above the lenses of the eyeglasses. Preferably, the width of the visor case is slightly larger than the width of the eyeglasses, so that the visor case will bow upwardly over the lenses, as illustrated in FIG. 8. When in this position, the plies of material 20 and 30 of the visor case normally will be in abutment with each other, with each ply of material tending to support and rigidify the other ply of material. Thus, a relatively stable brim or visor is formed by the visor case when mounted to a pair of eyeglasses in the manner illustrated in FIGS. 1 and 8.

Figure 9:
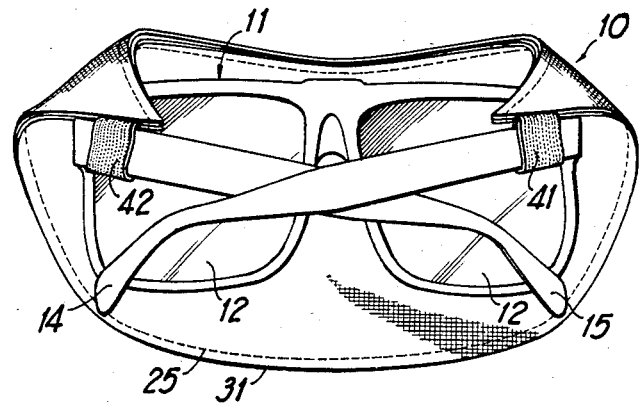
FIG. 9 illustrates the eyeglasses visor and case mounted to the limbs of a pair of eyeglasses, with the limbs folded across the lenses of the eyeglasses, illustrating how the flexible visor and case folds with the limbs.

If the eyeglasses are removed from the face of the wearer and the limbs are folded across the lenses with visor case still attached to the eyeglasses as illustrated in FIG. 9, the flexibility of the visor case will permit the end portions of the visor case to bend with the limbs of the eyeglasses. This tends to fold the central portion of the visor to an attitude approximately parallel to the lenses 12 of the eyeglasses. Therefore, the surfaces of the lenses on the opposite side from the limbs 14 and 15 that are normally exposed for scratching and abrasion, will be protected by the presence of the visor (FIG. 9).

As illustrated in FIGS. 7 and 10, the plies of material 20 and 30 can be separated by opening the visor case at the concave edges, which exposes the pocket 29. The pair of eyeglasses 11 can be inserted in the pocket formed between the plies of material, with the limbs 14 and 15 of the eyeglasses folded across the lenses 12. Once the eyeglasses have been inserted inside the visor case, the concave edges of the visor case can be urged intermediate their ends together so that the releasable fastener elements 35 and 38 engage each other and hold the glasses in the pocket.

Although this invention has been described in the form of a preferred embodiment, many modifications, additions, and deletions, may be made thereto without departure from the spirit and scope of the invention, a set forth in the following claims.

I claim:

1. A visor to be mounted to the limbs of a pair of eyeglasses or the like and worn in front of the forehead to shade the eyes comprising two plies of approximately cresent-shaped material in overlying relationship having aligned concave edges for placement adjacent the forehead and aligned convex edges for extending away from the forehead, said plies of material being attached to each other along their convex edges and unattached along their concave) edges to form a pocket therebetween, the pocket formed by said plies of material being of a size large enough to substantially contain the eyeglasses, and limb attachment means connected to said plies of material adjacent the ends of the convex edges for attaching the visor to the limbs of a pair of eyeglasses.

2. The visor of claim 1 and further including releasable attachment means connected to said plies of material at said concave edges for releasably connecting the concave edges and closing the pocket.

3. The visor of claim 1 and wherein said limb attachment means each comprise a loop of elastic material through which the limbs of eyeglasses are received.

4. The visor of claim 2 and wherein said releasable attachment means comprises one connector member attached to one play of material and another connector member attached to the other ply of material, with said connector members positioned in overlying relationship between the ends of said concave edges of said plies of material, whereby eyeglasses and the like can be placed in the pocket between the plies of material and the releasable attachment means can close the pocket about the eyeglasses.

5. The visor of claim 1 and wherein each of said limb attachment means comprises a flat band of elastic material formed in a loop and with the ends of the band sewn together and to said plies of material, whereby when the limbs of a pair of eyeglasses are received in the loops of the attachment means tends to support the visor in front of the eyeglasses.

* * * * *